HARMONIC GENERATOR EMPLOYING ANTI-RESONANT TRAPS IN THE INPUT AND OUTPUT CIRCUITS FOR FREQUENCY SEPARATION

Filed Nov. 23, 1964

INVENTORS.
EDWARD A. MURPHY
WILLIAM POSNER
SIMON ECKSTEIN
DAVID B. SCHILB

BY R. J. Frank
ATTORNEY.

United States Patent Office 3,335,357

Patented Aug. 8, 1967

3,335,357

HARMONIC GENERATOR EMPLOYING ANTI-RESONANT TRAPS IN THE INPUT AND OUTPUT CIRCUITS FOR FREQUENCY SEPARATION

Edward A. Murphy, Farmingdale, William Posner, Brooklyn, Simon Eckstein, Bronx, and David B. Schilb, Franklin Square, N.Y., assignors to General Telephone and Electronics Laboratories, Inc., a corporation of Delaware Filed Nov. 23, 1964, Ser. No. 413,033
6 Claims. (Cl. 321—69)

ABSTRACT OF THE DISCLOSURE

A harmonic generator is constructed of a section of transmission line divided by a non-linear reactance into an input section that is both series resonant at the input frequency and an anti-resonant trap at the harmonic frequency and an output section that is both series resonant at the harmonic frequency and an anti-resonant trap at the input frequency.

This invention relates to a harmonic generator, and more particularly to a novel coaxial harmonic generator wherein the input and output circuits are electrically separated without requiring the use of external filtering means.

The generation of radio frequency signals in the microwave region has given rise to an increasing interest in solid state harmonic generators. These harmonic generators allow the use of a driving frequency low enough to obtain reasonable amounts of power while also permitting the use of a crystal oscillator to maintain the accuracy of the driving frequency. The generators consist basically of a non-linear element which when driven by a fundamental frequency signal produces many harmonics. Although the non-linear element may be a resistive element, the absorption of power thereby has favored the use of non-linear reactances. Two types of variable non-linear reactances are currently available, the non-linear capacitor characterized by a junction diode, and the non-linear inductor of which certain ferrite materials are examples.

The variable reactance junction diode, or varactor, is generally preferred as the non-linear element since it is found well suited for high frequency operation. The varactor is a reverse-biased semiconductor diode in which the junction capacitance is a function of the voltage across the junction. By varying this voltage rapidly from a source of high frequency energy, the varactor generates significant amounts of harmonic power at frequencies which are multiples of the driving frequency.

The power handling capability of a varactor diode is determined primarily by the amount of heat that it can dissipate without experiencing breakdown. Since the power contained in the lowest-order harmonic is substantially greater than that existing at higher-order harmonics, it has been found advantageous to utilize the second harmonic as the output signal in applications wherein the varactor diode is operated near its dissipation limit. This is due primarily to the fact that for higher harmonic frequency output signals the diode operates not only on the input signal but also on all lesser harmonics. This cumulative effect often results in diode breakdown when higher power output signals are desired. Therefore, harmonic generators are normally operated as frequency doublers connected in tandem with the output of the preceding one appearing as the input to the next succeeding generator.

Also, to provide reasonable amounts of output power at the highest frequency, it is desirable to employ harmonic generators having a high efficiency. This high efficiency requirement is most apparent with tandem harmonic generators wherein the overall efficiency is determined by the product of the individual generator efficiencies.

Two general circuit configurations can be used to generate harmonics. One configuration, referred to as the series-type circuit, employs a varactor diode connected in series between the input and output circuit and as a result thereof generates an entire spectrum of harmonic frequencies. In addition, the series connection of the diode has been found not to provide the degree of heat sinking normally required in high power harmonic generation.

The second circuit configuration, known as the shunt-type circuit, uses a varactor diode which is connected in shunt so as to be common to both the input and output circuits. In this type of circuit, the varactor diode can be used to generate only the desired frequency harmonic and thus the efficiency is found to be normally higher than that of the series-type circuit. Also, the shunt connection enables one end of the varactor diode to be connected to ground which in turn provides the required heat sinking necessary for effective heat dissipation.

In the operation of a harmonic generator, for example a frequency doubler, it is desirable for the fundamental and second harmonic frequencies to be confined to the input and output circuit respectively. The frequency separation may be readily performed at low frequencies by providing frequency traps or appropriate filters in the input and output circuits. However at microwave frequencies, i.e. frequencies in the hundreds of megacycles per second or above range, it has been found difficult to incorporate effective frequency traps in the circuits. This difficulty arises from the fact that at these high frequencies, distributed-element circuits rather than lumped-element circuits must be employed.

In the approximate frequency range of 500 mc. to 6000 mc. per second, the distributed-element circuits are in the form of coaxial transmission lines. A shunt-type harmonic generator operating within this range generally employs input and output resonant circuits with the varactor diode common to both. The input and output circuits are electrically separated by the combined effect of the resonant circuits and filters connected externally to the harmonic generator. However, connecting the filters externally results in the presence of a portion of the fundamental current in the output cavity which is resonant at the desired harmonic and vice versa, thus reducing the efficiency of the generator.

Accordingly, an object of the present invention is the provision of a coaxial harmonic generator wherein the input and output circuits are electrically separated by the distributed-element circuit without requiring external filtering means.

Another object is to provide a harmonic generator having an improved efficiency.

A further object is to provide a harmonic generator of reduced circuit complexity and having an increased ease of tuning for optimum performance.

Yet another object is to provide a harmonic generator having increased power-handling capability.

In accordance with the present invention, an improved coaxial harmonic generator is constructed with an input circuit series resonant at the input frequency which includes an anti-resonant trap tuned to the output frequency and an output circuit series resonant at the output frequency which includes an anti-resonant trap tuned to the input frequency. Although these traps are a result of the electrical dimensions of the input and output circuits, the electrical equivalent of each trap is a parallel resonant circuit which resonates at the hereinafter referred to anti-resonant frequency. By so constructing the input and output circuits, the electrical separation required for high efficiency harmonic generation is obtained without requiring external filters.

The coaxial harmonic generator of the present invention comprises a section of coaxial transmission line terminated at each end with a short-circuit. A varactor diode is mounted in shunt between the inner and outer conductors of the coaxial section and is common to both the input and output circuits.

The input circuit is made to have an electrical length substantially equal to one-eighth of a wavelength at the input frequency. The center conductor in the input circuit is broken to provide a variable gap capacitor which is in series with the varactor capacitance. As known in the art, a transmission line having a length of one-eighth of a wavelength is an inductive reactance and therefore the input circuit can be made series resonant with the series combination of the gap and varactor capacitances. Since the input circuit is one-eighth of a wavelength at the input frequency, it is one-fourth of a wavelength at the output frequency and provides an anti-resonant trap, i.e. an extremely high impedance, to currents flowing at the output frequency.

The output circuit is made slightly longer than one-half a wavelength at the output frequency and therefore exhibits an inductive reactance. A gap capacitance is provided in the output circuit and is in series with the varactor capacitance. Thus, the output circuit can be made series resonant at the output frequency. However, the electrical length of the output circuit for signals at the input frequency is essentially one-fourth of a wavelength and enables the output circuit to be anti-resonant at the input frequency. Thus, the present harmonic generator provides the desired electrical separation of the input and output circuits without requiring additional filters.

The input and output signals are coupled to and from the corresponding sections of the coaxial harmonic generator by conventional capacitive probes. These probes may be variable either in depth or position or both within the coaxial line to enable the harmonic generator to be impedance matched to the input and output transmission lines and tuned for optimum efficiency.

The novel construction of this harmonic generator enables high capacitance varactor diodes to be used and therefore provides an increase in the power handling capacity of the generator. The input and output resonant circuits are low inductive reactance circuits and consequently the capacitive reactance required for series resonance is low. Since capacitive reactance is an inverse function of capacitor size at a given frequency, lowering the capacitive reactance necessary for resonance permits a higher capacitance diode to be used. In addition, high capacitance diodes have large junction areas and increased power dissipation ratings. Thus at a given power level, the high capacitance diodes are found to operate cooler than low capacitance diodes. Since the series resistance of a varactor diode increases with increased temperature, the efficiency of the harmonic generator is improved when the diode operates at a relatively low temperature.

Further objects and advantages of the invention will become more readily apparent from the following description of a specific embodiment when viewed in conjunction with the accompanying drawings, in which.

Figure 1:
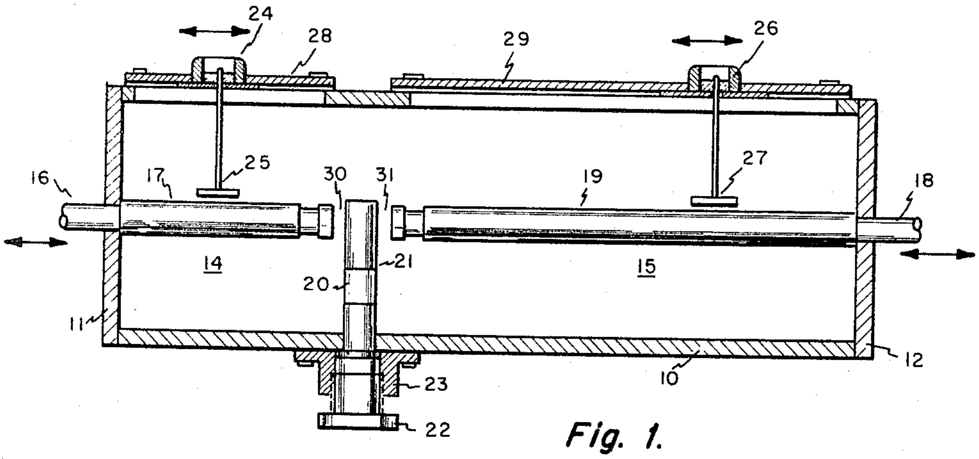
FIG. 1 is a side view in section of one embodiment of the invention.

Referring more particularly to FIG. 1, there is shown a harmonic generator comprising a section of coaxial transmission line 10 with its ends terminated by short-circuiting end walls 11 and 12. End walls 11 and 12 have centrally located openings therein about which hollow center conductors 17 and 19, respectively, are affixed. Extending through the openings in end walls 11 and 12 and through hollow conductors 17 and 19 are adjustable conductors 16 and 18, respectively. Thus, varying the depth of insertion of adjustable conductors 16 and 18 adjusts the length of the center conductor section 10. This construction serves to insure electrical contact between each end wall and its center conductor, while also maintaining the physical positions of the center conductors. Although the described embodiment refers to a section of coaxial transmission line, it will be apparent to those skilled in the art that equivalent forms of transmission lines, such as strip-line, may be employed.

The coaxial section contains an input cavity 14 and output cavity 15. A variable reactance element 20, such as a varactor diode mounted in a conventional varactor package 21, is positioned within coaxial section 10 by screw member 22 and a corresponding threaded fixture 23 mounted on the outer surface of the coaxial section. The varactor package is inserted so that its inner end is in line with center conductors 16 and 17. This configuration places the diode 20 in shunt and common to both the input and output cavities.

The input to cavity 14 is supplied from a conventional external coaxial connection 24 having its center conductor connected to capacitive coupling probe 25. The connection 24 is shown mounted on slide 28 and may be moved along the axis of cavity 10 until the cavity is impedance matched with the input line (not shown). Also, the depth of coupling probe 25 may be made adjustable for additional tuning if desired. The output from cavity 15 is similar except that connection 26 and associated probe 27 are mounted on slide 29 which is shown longer than slide 28.

Input cavity 14 has an electrical length substantially equivalent to one-eighth of a wavelength at the input frequency. As known in the art, a section of transmission line appears as an inductive reactance for lengths less than one-fourth of a wavelength and, at one-eighth of a wavelength, it appears as a relatively low inductive reactance having a magnitude equal to the characteristic impedance of the coaxial line used. The cavity 14 also contains a variable gap capacitor 30 which is easily adjusted by altering the depth of insertion of center conductor 16. The cavity includes in series, the afore-mentioned inductance and the series combination of the gap capacitance and the capacitance of the varactor diode. Adjustment of the center conductor 16 enables the cavity 14 to be tuned to series resonance at the input frequency and provides maximum current flow through the diode.

In addition, the cavity 14 has an electrical length of a quarter wavelength at the second harmonic of the input frequency. As known in the art, the short-circuited end wall 11 when reflected through one-fourth of a wavelength appears as an open circuit at the varactor diode. Thus cavity 14 serves as an anti-resonant trap for currents flowing at the second harmonic of the input frequency.

The output cavity 15 is selected to have an electrical length slightly larger than one-half wavelength, for example $0.55\lambda$, at the output frequency. This enables the cavity to exhibit a low inductive reactance at this frequency. The cavity 15 also contains a variable gap capacitor 31 in series with the capacitance of varactor diode 20. By adjusting center conductor 18, cavity 15 can be made series resonant at the output frequency to provide maximum current flow at that frequency. It will be noted that making cavity 15 only slightly greater than one-half wavelengh at the output frequency permits the use of a high capacitance varactor diode in the circuit since only a small capacitive reactance is needed for series resonance at this frequency.

As the input frequency is twice the output frequency, cavity 15 acts as an anti-resonant trap with a substantially open-circuit appearing at the diode to currents flowing at the input frequency. In practice, an insubstantial departure from the theoretical open-circuit exists at the varactor for the cavity length somewhat exceeds one-fourth of a wavelength at the input frequency. However, a very high impedance is presented at the varactor to the input frequency currents.

Figure 2:
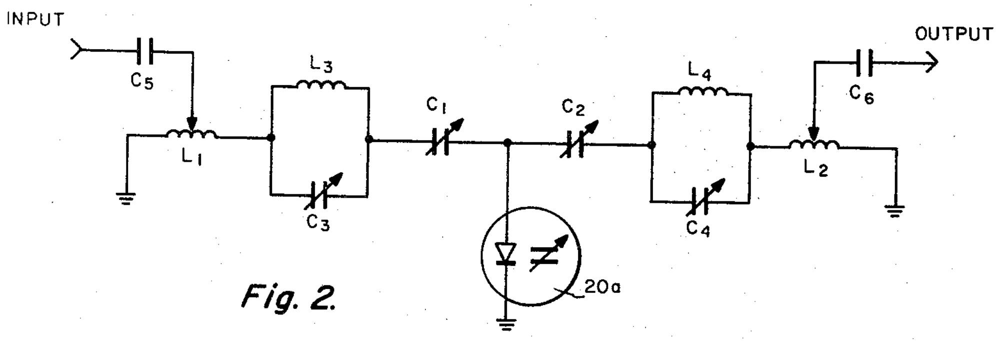
FIG. 2 is a diagram of the equivalent circuit of the embodiment of FIG. 1.

The electrical equivalent circuit for the harmonic generator is shown in FIG. 2 wherein capacitor $C_5$ represents the capacitive coupling probe 25. Inductance $L_1$ corresponds to the electrical length of cavity 14 at the input frequency with one end connected to ground. Gap capacitor 30 is shown as variable capacitor $C_1$.

Referring now to cavity 15, capacitor $C_6$ represents the capacitive coupling probe 27, inductance L2 corresponds to the electrical length of cavity 15 at the output frequency and gap capacitor 31 is shown as variable capacitor $C_2$.

The varactor diode **20*a*** is shown in a shunt-type connection common to both input and output circuits. The parallel resonant circuits comprising inductance $L_3$ and capacitance $C_3$ and, inductance $L_4$ and capacitance $C_4$, correspond to the electrical lengths of the input and output cavities at the output and input frequencies respectively.

During operation the coupling probes 25 and 27 are adjusted to match the generator with the input and output lines. The capacitor $C_1$ is varied by adjusting center conductor 16 until the series combination of inductance $L_1$, capacitance $C_1$, and diode 20 are series resonant at the input frequency. The capacitor $C_2$ is then varied by adjusting center conductor 18 until the series combination of inductance $L_2$, capacitance $C_2$ and diode **20*a*** are series resonant at the output frequency.

Figure 3:
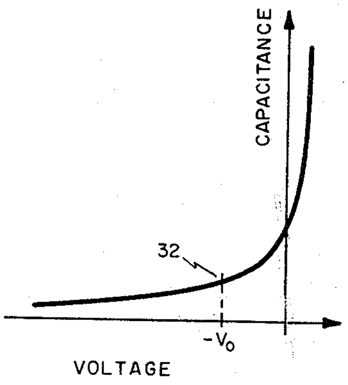
FIG. 3 is a graph showing the non-linear characteristics of a voltage-variable capacitor.

The non-linear voltage-capacitance characteristic of the varactor diode **20*a* is shown in FIG. 3. As known in the art, a varactor is a backbiased PN junction wherein the variation of the magnitude of the backbias voltage changes the width of the depletion layer across the junction to vary the capacitance. During operation, the varactor is found to establish a self-bias, $-V_o$, such that its operating point is shifted from the ordinate of FIG. 3 to point 32. The self-bias is maintained during operation by the D.C. blocking of gap capacitors 30 and 31**. The non-linearity of the varactor characteristic results in the generation of harmonics, with the second harmonic being the most significant.

The parallel resonant circuits or anti-resonant traps contained in each cavity insure that the fundamental or input frequency is substantially confined to the input cavity, while the second harmonic is confined to the output cavity. In one embodiment tested and operated, the power input was 5.8 watts at 750 mc. and the power output was 4.1 watts at 1500 mc. The efficiency of the harmonic generator was therefore 70.6 percent.

In addition, it was found that the harmonic generator provided improved efficiency at higher harmonic frequency outputs. However, the anti-resonant traps no longer provide the same degree of separation present in the harmonic doubler and external filters should be employed. When operated as a quadrupler, the output cavity does not suppress the second harmonic but permits it to be doubled by the varactor to thereby increase the higher order harmonic generation. In one test of the invention as a quadrupler with external filtering, a 6.0 watt input at 750 mc. was found to provide a 2.2 watt output at 3,000 mc. for an efficiency of 37%.

While the above invention has been described with reference to a particular embodiment, it will be understood that many modifications may be made without departing from the spirit and scope of the invention.

What is claimed is:

1. A harmonic generator which comprises (a) a section of transmission line terminated at each end in a short circuit, (b) a non-linear reactance mounted in shunt within said section, said reactance dividing the section of transmission line into an input and an output section, said input section having an electrical length substantially equal to one-eighth of a wavelength at the input frequency, said output section having an electrical length slightly larger than one-half of a wavelength at a harmonic of the input frequency to provide a low inductive reactance at said harmonic frequency, said input and output providing anti-resonant traps at the harmonic and input frequencies respectively, (c) means for coupling a signal at the input frequency to said input section, (d) first reactance means contained in said input section, the combination of said input section, said non-linear reactance and said first reactance means being series resonant at the input frequency, (e) second reactance means contained in said output section, the combination of said output section, said non-linear reactance, and said second reactance means being series resonant at the harmonic frequency, and (f) means for coupling the harmonic signal from said output section.

2. A harmonic generator which comprises (a) a section of transmission line terminated at each end in a short circuit, (b) a variable-capacitance diode mounted in shunt within said section, said diode dividing the section of transmission line into an input and an output section, said input section having an electrical length equal to one-eighth of a wavelength at the input frequency, said output section having an electrical length of about 0.55 of a wavelength at the second harmonic of the input frequency to exhibit a low inductive reactance at said second harmonic frequency, said input and output sections providing substantially anti-resonant traps at the second harmonic and input frequencies respectively, (c) means for coupling a signal at the input frequency to said input section, (d) first reactance means contained in said input section, the combination of said input section, said diode capacitance and said first reactance means being series resonant at the input frequency, (e) second reactance means contained in said output section, the combination of said output section, said diode capacitance and said second reactance means being series resonant at the second harmonic of the input frequency, and (f) means for coupling the harmonic signal from said output section.

3. A harmonic generator which comprises (a) a section of transmission line terminated at each end in a short circuit, (b) a variable-capacitance diode mounted in shunt within said section, said diode dividing the section of transmission line into an input and an output section, said input section having an electrical length equal to one-eighth of a wavelength at the input frequency, said output section having an electrical length such that it exhibits a low inductive reactance at the second harmonic of the input frequency, said input and output sections providing substantially anti-resonant traps at the second harmonic and input frequencies respectively, (c) means for coupling a signal at the input frequency to said input section, (d) a first adjustable capacitor contained in said input section, said capacitor being adjusted so that the combination of said input section, said diode capacitance and said first capacitor is series resonant at the input frequency, (e) a second adjustable capacitor contained in said output section, said capacitor being adjusted so that the combination of said output section, said diode capacitance, and said second capacitor is series resonant at the second harmonic of the input frequency, and (f) means for coupling the harmonic signal from said output section.

4. A harmonic generator which comprises (a) a section of coaxial transmission line terminated at each end in a short circuit, (b) a variable-capacitance diode mounted in shunt within said section, said diode dividing said coaxial section into input and output sections, said input section having an electrical length equal to one-eight of a wavelength at the input frequency, said output section having an electrical length slightly larger than one-half of a wavelength at the second harmonic of the input frequency to exhibit a low inductive reactance at said frequency, said input and output sections providing substantially anti-resonant traps at the second harmonic and input frequencies respectively, (c) means for coupling a signal at the input frequency to said input section, (d) a first capacitor connected in series with said input section, the combination of said input section, said diode capacitance and said first capacitor being series resonant at the input frequency, (e) a second capacitor connected in series with said output section, the combination of said output section, said diode capacitance and said second capacitor being series resonant at the second harmonic of the input frequency, and (f) means for coupling the harmonic signal from said output section.

5. A harmonic generator in accordance with claim 4 in which said output section has an electrical length of about 0.55 of a wavelength at the second harmonic of the input frequency.

6. A harmonic generator which comprises (a) a section of coaxial transmission line having a center and an outer conductor, said section being terminated at each end in a short-circuit.

(b) a variable-capacitance diode mounted within said coaxial section and connected in shunt between said center and outer conductors, said diode dividing said coaxial section into input and output sections, said input section having an electrical length equal to one-eighth of a wavelength at the input frequency, said output section having an electrical length slightly larger than one-half of a wavelength at the second harmonic of the input frequency, said input and output sections providing substantially anti-resonant traps at the second harmonic and input frequencies respectively, (c) means for coupling a signal at the input frequency to said input section, (d) a first gap capacitor connected in series with said input section, the combination of said input section, said diode capacitance and said first capacitor being series resonant at the input frequency, (e) a second gap capacitor connected in series with said output section, the combination of said output section, said diode capacitance and said second capacitor being series resonant at the second harmonic of the input frequency, and (f) means for coupling the harmonic signal from the output section.

References Cited

UNITED STATES PATENTS

| | | | |
|---|---|---|---|
| 3,196,339 | 7/1965 | Walker et al. | 321—69 |
| 3,267,352 | 8/1966 | Blight | 321—69 |
| 3,281,648 | 10/1966 | Collins | 321—69 |

OTHER REFERENCES

"A New Look at Coaxial Cavities for Varactor Multipliers" by G. Schaffner; Electronics, May 17, 1965; vol. 38, No. 10, pp. 56–64.

JOHN F. COUCH, *Primary Examiner.*

G. GOLDBERG, *Assistant Examiner.*